PREPARATION OF SWEETENED FRUIT JUICE CONCENTRATE
Filed June 24, 1949
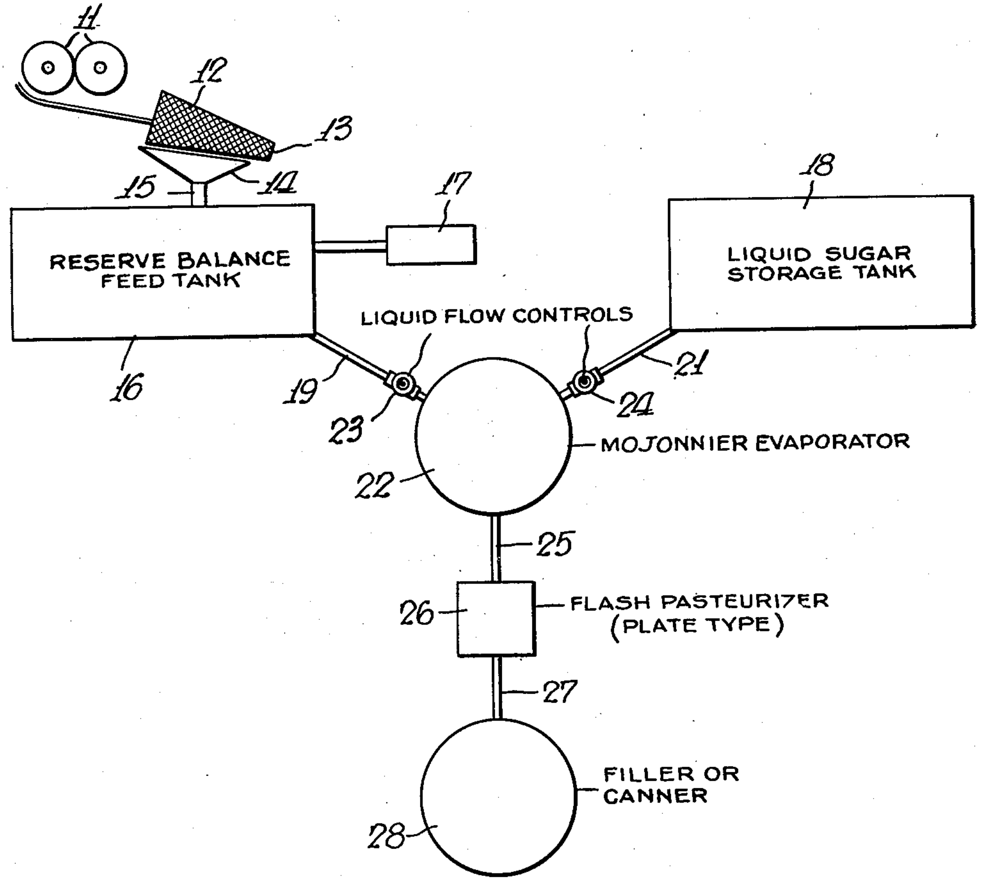
INVENTORS
Rom T. Johnson
Elwood F. Hansen
BY
Dean Fairbank & Hirsch
ATTORNEYS United States Patent Office 2,701,771

Patented Feb. 8, 1955

2,701,771

PREPARATION OF SWEETENED FRUIT JUICE CONCENTRATE

Rom T. Johnson, Hastings, and Elwood F. Hansen, Franklin Square, N. Y., assignors, by mesne assignments, to C & C Super Corporation, New York, N. Y., a corporation of Delaware Application June 24, 1949, Serial No. 101,044

3 Claims. (Cl. 99—205)

This invention relates to the preparation of sweetened fruit juice concentrate, and more particularly to a continuous method and system for sweetening the juice, evaporating, pasteurizing and canning the same.

Where sweetened fruit juice concentrate is prepared by a batch process which involves a plurality of successive steps including juice extraction, sweetening, evaporation, pasteurizing and canning, and the batch is left standing and exposed to the air, during the step of adding a predetermined quantity of sweetening agent to the volume of juice in order that the resultant mixture have the desired ratio of juice to sugar, and before each of the succeeding steps, settling of the various ingredients of the mixture may take place during the steps of the process and the contents of the various cans of even the same batch are likely to be non-uniform, and in addition, the process is exceedingly time consuming and requires considerable manual handling with resultant high cost of production. As a considerable period of time elapses during the various steps from the juice extraction to the canning operation, during which time the mixture is exposed to the air, oxidation may occur with resultant rancidity and loss of flavor, and in addition bacterial growth and microbial and enzymic changes may occur with resultant contamination and spoilage of the product even after it is in the sealed cans or containers.

It is accordingly among the objects of the invention to provide an apparatus and method whereby a sweetening agent may be added to fruit juices and the resultant mixture concentrated to reduce its water content as by evaporation, and thereupon sterilized and canned in a closed continuous flow system, in a relatively short period of time at a relatively low cost and without manual handling or exposure to air and by the use of which apparatus and method, the contents of all of the cans or containers filled, are substantially uniform in concentration of juice and sugar, and microbial and chemical changes are kept to a minimum, hence maintaining substantially the natural flavor of the mixture and increasing its keeping quality.

According to the invention, juice and sugar solution are fed continuously at a uniform relative rate, mixed, and concentrated in an evaporator of the continuous flow type maintained under a vacuum so that the mixture may be concentrated to the desired level at a relatively low temperature.

Preferably oxygen is removed from the juice prior to evaporation and the concentrated mixture is fed from the evaporator to a closed type pasteurizer, which serves to sterilize the mixture which is constantly flowing therethrough to protect the latter from enzymic action. After the mixture has been pasteurized, it is desirably fed directly into a filling or canning mechanism wherein the mixture is vacuum sealed in suitable containers.

In the accompanying drawing in which is shown one of various possible embodiments of the several features of the invention, the single figure diagrammatically shows the continuous flow system from the juice extracting device to the canning mechanism.

Referring now to the drawing, a crushing device 11 is provided for extracting juice from fruit chosen to meet predetermined standards of flavor, color, sugar, acid and vitamin content and which are washed and cleaned prior to being fed to the crusher. Usually citrus fruit is used of selected type, or mixtures such as oranges and grapefruit, in desired ratio.

The crusher 11 may be of any conventional type now on the market, adapted either to ream the fruit or crush the fruit, depending upon the quantity of oil it is desired to extract from the fruit peel which oil affects the flavor of the juice.

A screen 12 is desirably associated with the crushing device 11 into which the latter discharges. This screen 12 is desirably of the revolving type, inclined so as to discharge seeds, peel and membranous matter at its lower end 13, the mesh of the screen being selected to conform to the pulp requirements desired in the particular mixture.

The juices pass through the screen 12 into the funnel top 14 and thence by way of pipe 15 into a reserve balance feed tank 16 where deaeration of the juices occurs. This may be performed by passing the juice down a spiral curve maintained under a vacuum of approximately 25 inches of mercury by a suitable pump 17. As such vacuum type tank is well known in the art, it will not be further described.

A liquid sugar storage tank 18 is also provided, containing for example, 76 degrees Brix liquid sugar. The tank is desirably provided with sterilizing lamps (not shown) to inhibit chemical changes and bacterial formation and also is suitably ventilated to permit escape of any gases that might develop.

The contents of tank 16 and sugar tank 18 are fed through pipes 19 and 21, respectively, into a low temperature continuous flow evaporator 22, as for example of the type put out by Mojonnier Bros. Co. of Chicago, Illinois, under the trade-mark "Lo-Temp" Evaporator. This evaporator is operated under a vacuum so that the water in the mixture may be evaporated and the mixture concentrated to the desired degree at a temperature of approximately 60 degrees F., which is desirable, as the heat sensitive nature of citrus juice, as well as the importance of preserving its vitamin content make it desirable to concentrate at low temperatures.

In order that the resultant mixture have the desired ratio of juice to sugar, it is necessary that the ratio between the rate of feed of liquid passing into the evaporator through the pipes 19 and 21 from the feed tank 16 and sugar tank 18, respectively, be constant, regardless of the pressure heads due to the level of the liquids in the tanks 16 and 18. To this end suitable valves 23 and 24, desirably of the type put out by Proportioneers, Inc., of Providence, Rhode Island, and known as "Treet-O-Control," are positioned in the lines 19 and 21, respectively, which valves are capable of automatic adjustment to assure constancy in the relative rate of feed of juice and sugar, regardless of variations in the pressure heads of the respective supply tanks 16 and 18.

The mixture, after it leaves the evaporator 22, is fed through a pipe 25, desirably into a plate type flash evaporator 26, illustratively of the type put out by Walker-Wallace, Inc. of Buffalo, New York, under the name "Paraflow." This pasteurizer which serves to sterilize the product by destroying harmful bacteria or microbes, operates in a hermetically sealed or completely closed cycle and hence any danger of contamination of the mixture due to exposure to the air is avoided.

The mixture which has a temperature of approximately 185 degrees F., as it leaves the pasteurizer 26, is thereupon fed through a pipe 27 to a filling or canning machine 28 from which the mixture is directly discharged into suitable receptacles which are thereupon vacuum sealed. As the product is canned directly from the pasteurizer, its temperature will remain sufficiently high to sterilize the containers as it is poured thereinto.

After the containers are sealed, suitable means (not shown) are provided to cool such containers to room temperature in a relatively short period of time of approximately 40 minutes so as to prevent changes in flavor and taste normally incidental to lingering heat exposure.

With the apparatus and method above described, except for the short period of time that the juice is exposed to air during the action of the crusher 11 and until it flows into pipe 15, it passes through a closed, continuous flow system and is never again exposed to the outside air until it is poured into the containers during the canning operation, and hence any danger of contamination is avoided. As the juices are deaerated in feed tank 16, oxygen present in the air and dissolved in the juice will be removed, thereby eliminating the danger of oxidation which might cause the development of terpene rancidity and off flavor.

By reason of the fact that during the entire process after the juice and liquid sugar are mixed, that is from the time the liquids enter the evaporator to the time the containers are filled, the mixture is in motion, there is no likelihood of the various ingredients of the mixture settling which could readily occur in the batch method and consequently, the proportion of juice and liquid sugar in every container will be uniform.

Although pumps could be used to convey the liquid to the various stages of the apparatus, in the embodiment herein shown, a gravity flow is illustrated.

As many changes could be made in the above method and apparatus and many apparently widely different embodiments of this invention could be made without departing from the scope of the claims, it is intended that all matter shown in the accompanying drawing or container in the above description shall be interpreted as illustrative and not in a limiting sense.

Having thus described our invention, what we claim as new and desire to secure by Letters Patent of the United States is:

1. The method of preparing sweetened fruit juice concentrate which comprises extracting a quantity of juice from fruit, removing oxygen from the juice, thereupon feeding the juice and a sugar solution in separate streams continuously at a uniform relative rate, mixing the juice and sugar solution, and thereupon obtaining the desired concentration by evaporating the mixture under a vacuum at a relatively low temperature well below the boiling point of water, the removal of the oxygen from the juice, the mixing of the juice and sugar solution and the evaporation of the mixture all taking place while the liquid is flowing.

2. The method recited in claim 1, in which the concentrated mixture of juice and sweetening agent is discharged in a stream through a pasteurizer, the pasteurizing operation taking place while the mixture is flowing.

3. The method recited in claim 1 in which the concentrated mixture of juice and sweetening agent is discharged in a stream through a pasteurizer, the pasteurizing operation taking place under a hermetically sealed condition while the mixture is flowing.

References Cited in the file of this patent

UNITED STATES PATENTS

| | | |
|---|---|---|
| 1,989,399 | Browne | Jan. 29, 1935 |
| 2,054,092 | Mills | Sept. 15, 1936 |
| 2,061,188 | Cowgill | Nov. 17, 1936 |
| 2,087,077 | Wadsworth et al. | July 13, 1937 |
| 2,169,362 | Lachman | Aug. 15, 1939 |
| 2,236,692 | Neil | Apr. 1, 1941 |
| 2,270,007 | McKinnis | Jan. 13, 1942 |
| 2,368,945 | Peebles | Feb. 6, 1945 |
| 2,450,774 | Zahm | Oct. 5, 1948 |
| 2,453,109 | MacDowell | Nov. 9, 1948 |